US009658710B2

United States Patent
Yang

(10) Patent No.: US 9,658,710 B2
(45) Date of Patent: May 23, 2017

(54) PIXEL CIRCUIT, ITS DRIVING METHOD, ORGANIC LIGHT-EMITTING DIODE DISPLAY PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Shengji Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/769,244

(22) PCT Filed: Feb. 10, 2015

(86) PCT No.: PCT/CN2015/072644
§ 371 (c)(1),
(2) Date: Aug. 20, 2015

(87) PCT Pub. No.: WO2016/045301
PCT Pub. Date: Mar. 31, 2016

(65) Prior Publication Data
US 2016/0253014 A1    Sep. 1, 2016

(30) Foreign Application Priority Data

Sep. 23, 2014    (CN) .......................... 2014 1 0491603

(51) Int. Cl.
*G06F 3/041*    (2006.01)
*G09G 3/32*    (2016.01)
(Continued)

(52) U.S. Cl.
CPC ............ *G06F 3/0412* (2013.01); *G06F 3/042* (2013.01); *G06F 3/044* (2013.01); *G09G 3/32* (2013.01);
(Continued)

(58) Field of Classification Search
None
See application file for complete search history.

(56) References Cited

U.S. PATENT DOCUMENTS

2010/0097334 A1    4/2010    Choi et al.
2011/0001711 A1    1/2011    Choi et al.
(Continued)

FOREIGN PATENT DOCUMENTS

CN    103246396 A    8/2013
CN    103456267 A    12/2013
(Continued)

OTHER PUBLICATIONS

First Office Action regarding Chinese application No. 201410491603.6, dated Dec. 24, 2015. Translation provided by Dragon Intellectual Property Law Firm.
(Continued)

*Primary Examiner* — Kenneth B Lee, Jr.
(74) *Attorney, Agent, or Firm* — Harness, Dickey & Pierce, P.L.C.

(57) ABSTRACT

The present disclosure provides a pixel circuit, its driving method, an organic light-emitting diode (OLED) display panel, and a display device. According to the present disclosure, a display driving module and a touch detection module are configured to multiplex a first scanning line and a second scanning line, so it is able to eliminate an effect of a threshold voltage of a driving transistor on a light-emitting driving signal, thereby to improve the brightness evenness of the OLED display panel and improve a display effect of the display device. In addition, the pixel circuit in the embodiments of the present disclosure may achieve the touch detection and the display driving simultaneously by
(Continued)

multiplexing a control signal, so it is able to achieve the integration of the display driving and the touch detection in an effective manner.

20 Claims, 11 Drawing Sheets

(51) Int. Cl.
*G06F 3/042* (2006.01)
*G06F 3/044* (2006.01)
*G09G 3/3208* (2016.01)
*G09G 3/3233* (2016.01)

(52) U.S. Cl.
CPC ......... *G09G 3/3208* (2013.01); *G09G 3/3233* (2013.01); *G06F 3/0416* (2013.01); *G09G 2300/0819* (2013.01); *G09G 2300/0842* (2013.01); *G09G 2300/0861* (2013.01); *G09G 2320/0233* (2013.01)

(56) References Cited

U.S. PATENT DOCUMENTS

2013/0063398 A1 3/2013 Ko et al.
2016/0246424 A1* 8/2016 Yang .................... G06F 3/0412

FOREIGN PATENT DOCUMENTS

| CN | 203503280 U | 3/2014 |
| CN | 103996376 A | 8/2014 |
| CN | 103996377 A | 8/2014 |
| CN | 104091563 A | 10/2014 |
| CN | 104252844 A | 12/2014 |

OTHER PUBLICATIONS

Written Opinion of the International Searching Authority for international application No. PCT/CN2015/072644.

* cited by examiner

PIXEL CIRCUIT, ITS DRIVING METHOD, ORGANIC LIGHT-EMITTING DIODE DISPLAY PANEL AND DISPLAY DEVICE

CROSS-REFERENCE TO RELATED APPLICATION

This application is the U.S. national phase of PCT Application No. PCT/CN2015/072644 filed on Feb. 10, 2015, which claims a priority of the Chinese Patent Application No. 201410491603.6 filed on Sep. 23, 2014, the disclosures of which are incorporated in their entirety by reference herein.

TECHNICAL FIELD

The present disclosure relates to the field of display technology, in particular to a pixel circuit, its driving method, an organic light-emitting diode (OLED) display panel, and a display device.

BACKGROUND

An active matrix organic light-emitting diode (AMO-LED) display has currently become a hotspot in the research field of a flat-panel display. As compared with a liquid crystal display (LCD), the OLED display has such advantages as low power consumption, low production cost, self-luminescence, a wide viewing angle and rapid response. Recently, the OLED display has replaced with the traditional LCD in mobile phones, personal digital assistants (PDAs) and digital cameras. The design of a pixel driving circuit, as a core technique for the AMOLED display, is of very important significance.

Different from a thin film transistor LCD (TFT-LCD) where the brightness is controlled through a stable voltage, the OLED display is driven by a current, and it is required to control the light emission through a stable current. Due to the limitations of a manufacture process and the aging of elements, a threshold voltage ($V_{th}$) of a driving TFT for each pixel will be drifted, which thus result in a change of the current flowing through the OLED of each pixel along with the threshold voltage. As a result, uneven display brightness will occur and a display effect of an entire image will be adversely affected.

Recently, an in-cell touch technique has been successfully applied in the LCD, so as to provide a thin LCD display and improve the integration thereof. Hence, the integration of the in-cell touch technique with the AMOLED will certainly become a new trend of the display device.

SUMMARY

An object of the present disclosure is to provide a pixel circuit, its driving method, an OLED display panel and a display device, so as to improve the brightness evenness of the OLED display panel, improve a display effect of the display device, and achieve the integration of display driving and touch detection in an effective manner.

In one aspect, the present disclosure provides in one embodiment a pixel circuit, including a first storage capacitor, a driving transistor, and an OLED. A first electrode of the driving transistor is connected to a first signal source, a gate electrode thereof is connected to a second end of the first storage capacitor, and a second electrode thereof is connected to an anode of the OLED.

The pixel circuit further includes: a display driving module connected to a first scanning line, a second scanning line, a data line, the first signal source, a second signal source, a first end and the second end of the first storage capacitor, and configured to, within a time period, compensate for a threshold voltage of the driving transistor using a data signal from the data line and a first signal from the first signal source under the control of a first scanning signal from the first scanning line and the second scanning signal from the second scanning line, to make a light-emitting driving signal for the OLED be irrelevant to the threshold voltage of the driving transistor within a fourth stage of the time period; and a touch detection module connected to the first scanning line, the second scanning line and a signal read line, and configured to, within the time period, detect a touch signal for a touch panel under the control of the first scanning signal from the first scanning line and the second scanning signal from the second scanning line.

Alternatively, the display driving module includes a first TFT, a second TFT, a third TFT, a fourth TFT and a fifth TFT. A first electrode of the first TFT is connected to the first signal source, a gate electrode thereof is connected to the second scanning line, and a second electrode thereof is connected to the first electrode of the driving transistor. A first electrode of the second TFT is connected to the first electrode of the driving transistor, a gate electrode thereof is connected to the first scanning line, and a second electrode thereof is connected to the second end of the first storage capacitor. A first electrode of the third TFT is connected to the data line, a gate electrode thereof is connected to the first scanning line, and a second electrode thereof is connected to the first end of the first storage capacitor. A first electrode of the fourth TFT is connected to the first end of the first storage capacitor, a gate electrode thereof is connected to the second scanning line, and a second electrode thereof is connected to the second electrode of the driving transistor. A first electrode of the fifth TFT is connected to the second electrode of the driving transistor, a gate electrode thereof is connected to the first scanning line, and a second electrode thereof is connected to the second signal source.

Alternatively, the first signal is a high level signal, and a second signal from the second signal source is a low level signal or the ground serves as the second signal source.

Alternatively, the touch detection module is a photosensitive touch detection module, which is configured to, based on an illumination change due to a touch operation, detect the touch signal for the touch panel under the control of the first scanning signal from the first scanning line and the second scanning signal from the second scanning line. The photosensitive touch detection module is further connected to the data line.

Alternatively, the photosensitive touch detection module includes a second storage capacitor, a first switching transistor, a photosensitive transistor and a second switching transistor. A first electrode of the first switching transistor is connected to the data line, a gate electrode thereof is connected to the first scanning line, and a second electrode thereof is connected to a first electrode and a gate electrode of the photosensitive transistor and a second end of the second storage capacitor. A second electrode of the photosensitive transistor is connected to a first end of the second storage capacitor, and the photosensitive transistor is configured to generate, based on illumination intensity, a corresponding current signal for charging the second storage capacitor. A first electrode of the second switching transistor is connected to the first end of the second storage capacitor, a gate electrode thereof is connected to the second scanning line, and a second electrode thereof is connected to the signal read line.

Alternatively, the touch detection module is a capacitive touch detection module, which is configured to, based on a capacitance change due to a touch operation, detect the touch signal for the touch panel under the control of the first scanning signal from the first scanning line and the second scanning signal from the second scanning line. The capacitive touch detection module is further connected to a third signal source.

Alternatively, the third signal source is configured to input a signal with a fixed potential to the capacitive touch detection module.

Alternatively, the third signal source is a common electrode signal.

Alternatively, the capacitive touch detection module includes a third storage capacitor, a resetting transistor, an amplifying transistor and a third switching transistor. A first electrode of the resetting transistor is connected to the first end of the first storage capacitor, a gate electrode thereof is connected to the first scanning line, and a second electrode thereof is connected to a first end of the third storage capacitor and a gate electrode of the amplifying transistor. A first electrode of the amplifying transistor is connected to a second end of the third storage capacitor and the third signal source, and a second electrode thereof is connected to a first electrode of the third switching transistor. A gate electrode of the third switching transistor is connected to the second scanning line, and a second electrode thereof is connected to the signal read line.

Alternatively, the transistors are N-type transistors, the first electrode is a source electrode and the second electrode is a drain electrode.

Alternatively, the first signal is a high level signal, and the second signal from the second signal source is a low level signal or a zero-potential signal.

In another aspect, the present disclosure provides in one embodiment a method for driving the above mentioned pixel circuit, including steps of: within a time period, compensating for a threshold voltage of a driving transistor using a data signal from a data line and a first signal from a first signal source under the control of a first scanning signal from a first scanning line and a second scanning signal from a second scanning line, to make a light-emitting driving signal for an OLED be irrelevant to the threshold voltage of the driving transistor at a fourth stage within the time period; and within the time period, detecting a touch signal for a touch panel under the control of the first scanning signal from the first scanning line and the second scanning signal from the second scanning line.

Alternatively, the step of, within the time period, compensating for the threshold voltage of the driving transistor using the data signal from the data line and the first signal from the first signal source under the control of the first scanning signal from the first scanning line and the second scanning signal from the second scanning line, to make the light-emitting driving signal for the OLED be irrelevant to the threshold voltage of the driving transistor at the fourth stage within the time period includes: at a first stage of the time period, enabling a first TFT, a second TFT, a third TFT, a fourth TFT and a fifth TFT to be each in an ON state so as to enable a first end of a first storage capacitor to be at a potential of the data signal and enable a second end of the first storage capacitor to be at a potential of the first signal; at a second stage of the time period, enabling the second TFT, the third TFT and the fifth TFT to be each in the ON state and enabling the first TFT and the fourth TFT to be each in an OFF state so as to enable the first end of the first storage capacitor to be at the potential of the data signal, and discharging the first storage capacitor so as to change a potential at the second end of the first storage capacitor from the potential of the first signal to a potential equal to the threshold voltage of the driving transistor, thereby to enable a voltage difference between the two ends of the first storage capacitor to be a difference between the threshold voltage of the driving transistor and the potential of the data signal; at a third stage of the time period, enabling the first TFT, the second TFT, the third TFT, the fourth TFT and the fifth TFT to be each in the OFF state so as to maintaining the voltage difference between the two ends of the first storage capacitor to be the difference between the threshold voltage of the driving TFT and the potential of the data signal; and at the fourth stage of the time period, enabling the first TFT and the fourth TFT to be each in the ON state, and enabling the second TFT, the third TFT and the fifth TFT to be each in the OFF state, so as to enable the potential at the first end of the first storage capacitor to be jumped from the potential of the data signal to a potential at a second electrode of the driving transistor, thereby to enable the potential at the second end of the first storage capacitor to be a sum of the difference between the threshold voltage of the driving transistor and the potential of the data signal, and the potential at the second electrode of the driving transistor.

Alternatively, the step of, within the time period, detecting the touch signal for the touch panel under the control of the first scanning signal from the first scanning line and the second scanning signal from the second scanning line includes, within the time period, detecting, by a photosensitive touch detection module, the touch signal for the touch panel based on an illumination change due to a touch operation under the control of the first scanning signal from the first scanning line and the second scanning signal from the second scanning line.

Alternatively, the step of, within the time period, detecting, by the photosensitive touch detection module, the touch signal for the touch panel based on the illumination change due to the touch operation under the control of the first scanning signal from the first scanning line and the second scanning signal from the second scanning line includes: at the first stage of the time period, enabling a first switching transistor and a second switching transistor to be each in an ON state, so as to enable a first end of a second storage capacitor, and a first electrode and a gate electrode of a photosensitive transistor to be at a potential of the data signal; at the second stage of the time period, enabling the first switching transistor to be in the ON state and enabling the second switching transistor to be in an OFF state, so as to maintain the first end of the second storage capacitor, and the first electrode and the gate electrode of the photosensitive transistor to be at the potential of the data signal; at the third stage of the time period, enabling the first switching transistor and the second switching transistor to be each in the OFF state, and generating by the photosensitive transistor, based on the illumination intensity, a corresponding current signal for charging the second storage capacitor; and at the fourth stage of the time period, enabling the first switching transistor to be in the OFF state and enabling the second switching transistor to be in the ON state, so as to transmit the current signal stored in the second storage capacitor to a signal read line, thereby to enable a processor connected to the signal read line to determine whether or not the touch operation has been made according to the current signal, and if yes, determine position information about a touch point.

Alternatively, the step of, within the time period, detecting the touch signal for the touch screen under the control of the first scanning signal from the first scanning line and the second scanning signal from the second scanning line includes, within the time period, detecting by a capacitive touch detection module, based on a capacitance change due to the touch operation, the touch signal for the touch panel under the control of the first scanning signal from the first scanning line and the second scanning signal from the second scanning line.

Alternatively, the step of, within the time period, detecting by the capacitive touch detection module, based on the capacitance change due to the touch operation, the touch signal for the touch panel under the control of the first scanning signal from the first scanning line and the second scanning signal from the second scanning line includes: at the first stage of the time period, enabling a resetting transistor and a third switching transistor to be each in the ON state, so as to enable a first end of a third storage capacitor and a gate electrode of an amplifying transistor to be at the potential of the data signal; at the second stage of the time period, enabling the resetting transistor to be in the ON state and enabling the third switching transistor to be in the OFF state, so as to maintain the first end of the third storage capacitor and the gate electrode of the amplifying transistor to be at the potential of the data signal; at the third stage of the time period, enabling the resetting transistor and the third switching transistor to be each in the OFF state; and at the fourth stage of the time period, enabling the resetting transistor to be in the OFF state, enabling the third switching transistor to be in the ON state, enabling the amplifying transistor to be in a corresponding state based on whether or not the touch operation for the touch panel has been made, so as to transmit by the signal read line a current signal corresponding to the state of the amplifying transistor, thereby to enable a processor connected to the signal read line to determine whether or not the touch operation has been made according to the current signal, and if yes, determine the position information about a touch point.

Alternatively, at the first stage of the time period, the first scanning signal is a high level signal, the second scanning signal is a high level signal, and the data signal is a low level signal; at the second stage of the time period, the first scanning signal is a high level signal, the second scanning signal is a low level signal, and the data signal is a low level signal; at the third stage of the time period, the first scanning signal is a low level signal, the second scanning signal is a low level signal, and the data signal is a high level signal; and at the fourth stage of the time period, the first scanning signal is a low level signal, the second scanning signal is a high level signal and the data signal is a high level signal.

In yet another aspect, the present disclosure provides in one embodiment an OLED display panel including the above-mentioned pixel circuit.

Alternatively, based on the requirements on a resolution for touch, the pixel circuits each having a touch detection module are arranged within a specified pixel unit in a predetermined manner.

In still yet another aspect, the present disclosure provides in one embodiment a display device including the above-mentioned OLED display panel.

According to the pixel circuit, its driving method, the OLED display panel and the display device in the embodiments of the present disclosure, the display driving module and the touch detection module are configured to multiplex the first scanning line and the second scanning line, so it is able to eliminate an effect of the threshold voltage of the driving transistor on the light-emitting driving signal, thereby to improve the brightness evenness of the OLED display panel and improve a display effect of the display device. In addition, the pixel circuit in the embodiments of the present disclosure may achieve the touch detection and the display driving simultaneously by multiplexing the control signal, so it is able to achieve the integration of the display driving and the touch detection in an effective manner.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
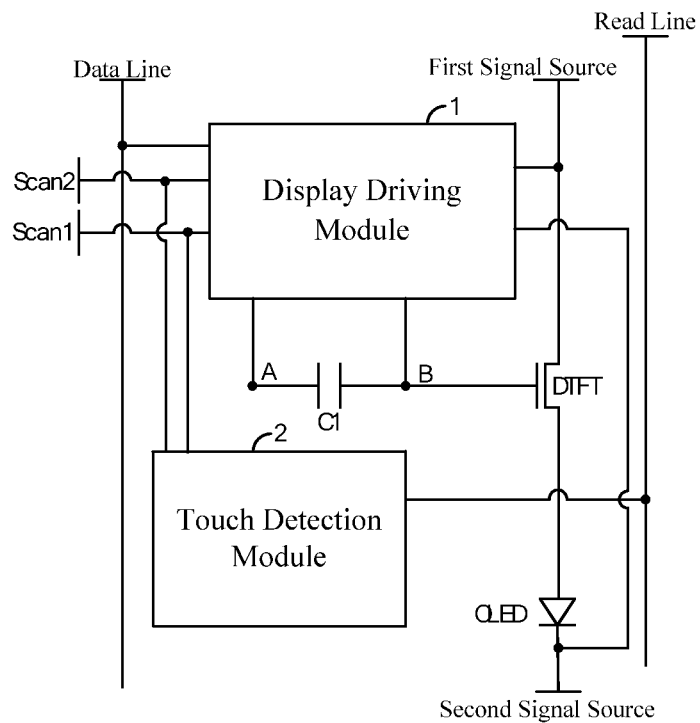
FIG. 1 is a schematic view showing a pixel circuit according to one embodiment of the present disclosure.

The present disclosure provides in one embodiment a pixel circuit which, as shown in FIG. 1, may include a first storage capacitor C1, a driving transistor DTFT, and an OLED. A first electrode of the driving transistor is connected to a first signal source, a gate electrode thereof is connected to a second end of the first storage capacitor C1, and a second electrode thereof is connected to an anode of the OLED.

As shown in FIG. 1, the pixel circuit may further include: a display driving module 1 connected to a first scanning line Scan1, a second scanning line Scan1, a data line, the first signal source, a second signal source, a first end (i.e., node A) and the second end (i.e., node B) of the first storage capacitor C1, and configured to, within a time period, compensate for a threshold voltage $V_{th}$ of the driving transistor using a data signal $V_{data}$ from the data line and a first signal $V_{dd}$ from the first signal source under the control of a first scanning signal $V_{Scan1}$ from the first scanning line and a second scanning signal $V_{Scan2}$ from the second scanning line, to make a light-emitting driving signal for the OLED be irrelevant to the threshold voltage $V_{th}$ of the driving transistor within a fourth stage of the time period; and a touch detection module 2 connected to the first scanning line, the second scanning line and a signal read line, and configured to, within the time period, detect a touch signal for a touch panel under the control of the first scanning signal $V_{Scan1}$ from the first scanning line and the second scanning signal $V_{Scan2}$ from the second scanning line.

In the embodiments of the present disclosure, as shown in FIG. 1, a cathode of the OLED may be connected to the second signal source.

In the embodiments of the present disclosure, the first signal $V_{dd}$ may be a high level signal, and a second signal from the second signal source may be a low level signal, or the ground may serve as the second signal source so as to input a zero potential.

The present disclosure further provides in one embodiment a method for driving the above-mentioned pixel circuit, which may include steps of: within one time period, compensating for the threshold voltage $V_{th}$ of the driving transistor using the data signal $V_{data}$ from the data line and the first signal $V_{dd}$ from the first signal source under the control of the first scanning signal $V_{Scan1}$ from the first scanning line Scan1 and the second scanning signal $V_{Scan2}$ from the second scanning line Scan2, to make the light-emitting driving signal for the OLED be irrelevant to the threshold voltage $V_{th}$ of the driving transistor at the fourth stage within the time period; and within the time period, detecting a touch signal for a touch panel under the control of the first scanning signal $V_{Scan1}$ from the first scanning line and the second scanning signal $V_{Scan2}$ from the second scanning line.

According to the pixel circuit and its driving method in the embodiments of the present disclosure, it is able to eliminate an effect of the threshold voltage $V_{th}$ of the driving transistor on the light-emitting driving signal, thereby to improve the brightness evenness of the OLED display panel and improve a display effect of the display device. In addition, the pixel circuit in the embodiments of the present disclosure may achieve the touch detection and the display driving simultaneously by multiplexing the control signal, so it is able to achieve the integration of the display driving and the touch detection in an effective manner.

Figure 2:
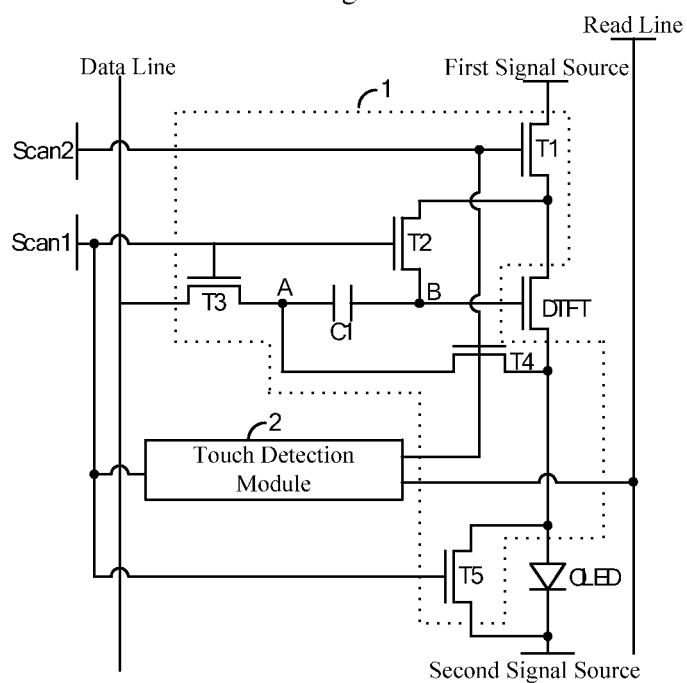
FIG. 2 is another schematic view showing the pixel circuit according to one embodiment of the present disclosure.

In one embodiment, as shown in FIG. 2, the display driving module 1 may include a first TFT T1, a second TFT T2, a third TFT T3, a fourth TFT T4 and a fifth TFT T5. A first electrode of the first TFT T1 is connected to the first signal source, a gate electrode thereof is connected to the second scanning line, and a second electrode thereof is connected to the first electrode of the driving transistor DTFT. A first electrode of the second TFT T2 is connected to the first electrode of the driving transistor DTFT, a gate electrode thereof is connected to the first scanning line, and a second electrode thereof is connected to the second end of the first storage capacitor C1. A first electrode of the third TFT T3 is connected to the data line, a gate electrode thereof is connected to the first scanning line, and a second electrode thereof is connected to the first end of the first storage capacitor C1. A first electrode of the fourth TFT T4 is connected to the first end of the first storage capacitor C1, a gate electrode thereof is connected to the second scanning line, and a second electrode thereof is connected to the second electrode of the driving transistor DTFT. A first electrode of the fifth TFT T5 is connected to the second electrode of the driving transistor DTFT, a gate electrode thereof is connected to the first scanning line, and a second electrode thereof is connected to the second signal source.

Figure 3:
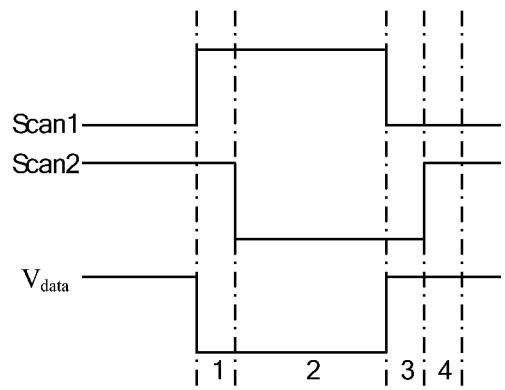
FIG. 3 is a sequence diagram of signals involved in a method for driving the pixel circuit according to one embodiment of the present disclosure.

The state of the display driving module driven by the above method will be described hereinafter in conjunction with the sequence diagram as shown in FIG. 3.

Figure 4:
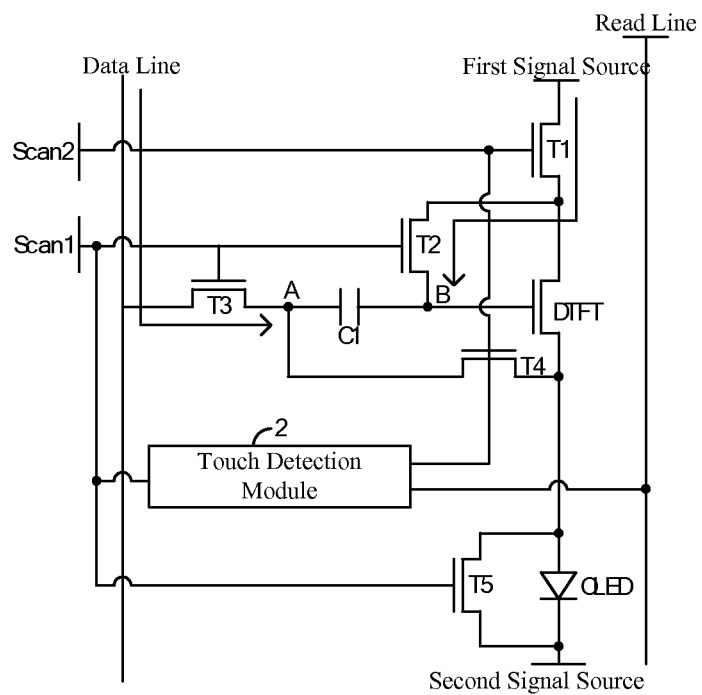
FIG. 4 is a schematic view showing a state of the pixel circuit at a first stage according to one embodiment of the present disclosure.

At a first stage, the display driving module 1 may be at a charging stage. FIG. 3 shows at Stage 1 the signals. To be specific, the first scanning signal $V_{Scan1}$ may be a high level signal, the second scanning signal $V_{Scan2}$ may be a high level signal, the data signal $V_{data}$ may be a low level signal, so as to enable the first TFT T1, the second TFT T2, the third TFT T3, the fourth TFT T4 and the fifth TFT T5 to be each in an ON state. As shown by a solid arrow in FIG. 4, the data signal $V_{data}$ from the data line is transmitted through the third TFT T3, which is in the ON state, to the first end of the first storage capacitor C1, i.e., node A, so as to charge the first end of the first storage capacitor C1 to be at a potential of the data signal $V_{data}$, i.e., $V_A=V_{data}$. Meanwhile, the first signal $V_{dd}$ from the first signal source is transmitted through the first TFT T1 and the second TFT T2, which are each in the ON state, to the second end of the first storage capacitor C1, i.e., node B, so as to charge node B to be at a potential of the first signal $V_{dd}$, i.e., $V_B=V_{dd}$.

Figure 5:
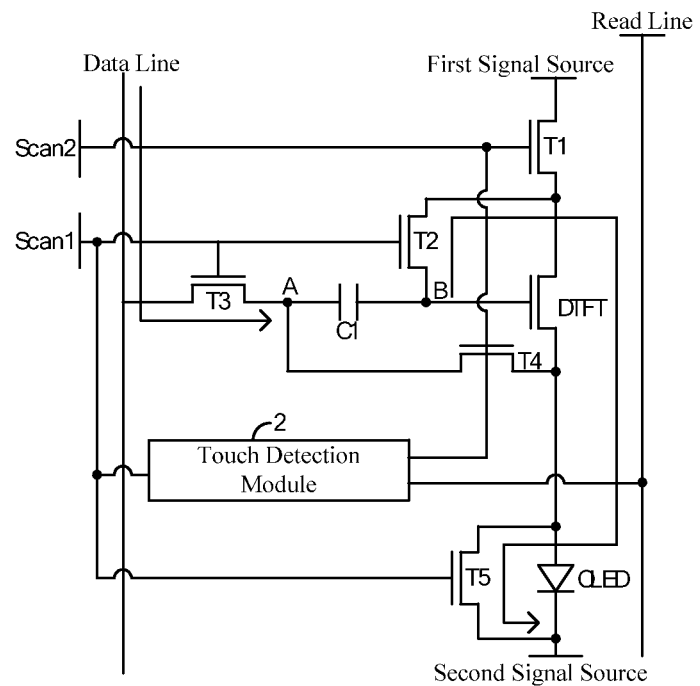
FIG. 5 is a schematic view showing a state of the pixel circuit at a second stage according to one embodiment of the present disclosure.

At a second stage, the display driving module 1 may be in a discharging and compensation stage. FIG. 3 shows at Stage 2 the signals. To be specific, the first scanning signal $V_{Scan1}$ may be a high level signal, the second scanning signal $V_{Scan2}$ may be a low level signal, and the data signal $V_{data}$ may be a low level signal, so as to enable the second TFT T2, the third TFT T3 and the fifth TFT T5 to be each in the ON state, and enable the first TFT T1 and the fourth TFT T4 to be in the OFF state. As shown by a solid arrow in FIG. 5, the third TFT T3 is in the ON state and the fourth TFT T4 is in the OFF state, so the node A is maintained at the potential of the data signal $V_{data}$, i.e., $V_A=V_{data}$. The second TFT T2 and the fifth TFT T5 are each in the ON state, and the first TFT T1 is in the OFF state, so node B starts to be discharged until a potential at node B is equal to the threshold voltage $V_{th}$ of the driving transistor DTFT, i.e., $V_B=V_{th}$. As a result, a voltage difference $V_{BA}$ between the two ends of the first storage capacitor is equal to $V_{th}-V_{data}$, i.e., equal to a difference between the threshold voltage $V_{th}$ of the driving transistor DTFT and the potential of the data signal $V_{data}$. At the second stage, the fifth TFT T5 is in the ON state, so no current flows through the OLED, and as a result, it is able to prolong a service life of the OLED.

At a third stage, the display driving module 1 may be at a stagnation stage. FIG. 3 shows at Stage 3 the signals. To be specific, the first scanning signal $V_{Scan1}$ may be a low level signal, the second scanning signal $V_{Scan2}$ may be a low level signal, and the data signal $V_{data}$ may be a high level signal, so as to enable the first TFT T1, the second TFT T2, the third TFT T3, the fourth TFT T4 and the fifth TFT T5 to be each in the OFF state, thereby to maintain the voltage difference between the two ends of the first storage capacitor to be a difference between the threshold voltage $V_{th}$ of the driving transistor DTFT and the potential of the data signal $V_{data}$, i.e., $V_{BA}=V_{th}-V_{data}$. As shown in FIG. 3, the third stage may be of a relatively short duration, so as to stabilize the voltage difference between nodes A and B after the complete discharge.

Figure 6:
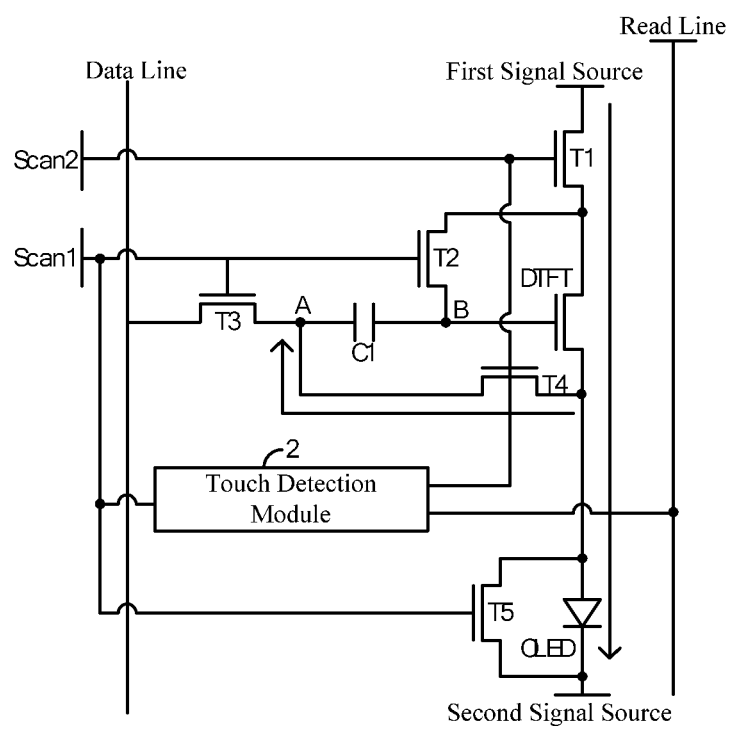
FIG. 6 is a schematic view showing a state of the pixel circuit at a fourth stage according to one embodiment of the present disclosure.

At a fourth stage, the display driving module 1 may be at a jumping and light-emitting stage. FIG. 3 shows at Stage 4 the signals. To be specific, the first scanning signal $V_{Scan1}$ may be a low level signal, the second scanning signal $V_{Scan2}$ may be a high level signal, and the data signal $V_{data}$ may be a high level signal, so as to enable the first TFT T1 and the fourth TFT T4 to be each in the ON state, and enable the second TFT T2, the third TFT T3 and the fifth TFT T5 to be in the OFF state. As shown by a solid arrow in FIG. 6, the fourth TFT T4 is in the ON state, so node A is connected to the second electrode of the driving transistor DTFT. The fifth TFT T5 is in the OFF state, so the potential at node A is changed to the potential at the second electrode of the driving transistor DTFT, i.e., $V_A=V_{oled}$. At this time, the second TFT T2 is in the OFF state, so node B is in a floating state. When the potential at node A is changed to $V_{oled}$, based on a bootstrapping effect of the first storage capacitor, the potential at node B may be jumped equally so as to maintain the voltage difference $V_{BA}$ between nodes A and B, i.e., $V_{th}-V_{data}$. At this time, the potential $V_B$ at node is equal to $V_{th}-V_{data}+V_{oled}$. The equal-voltage jumping procedure is a transient one, i.e., the voltage jumping and compensation are completed at node B within a very short period of time, and the OLED may enter the light-emitting stage rapidly.

Based on a saturation current equation for the driving transistor DTFT, the current flowing through the OLED may be calculated by the following equation:

$$\begin{aligned} I_{OLED} &= K(V_{GS}-V_{th})^2 \\ &= K[(V_{th}-V_{data}+V_{oled})-V_{oled}-V_{th}]^2 \\ &= K(V_{data})^2, \end{aligned}$$

wherein $V_{GS}$ is a gate-source voltage of the driving transistor, i.e., a voltage difference between the potential at the gate electrode (node B) of the driving transistor and the potential at the second electrode of the driving transistor, that is, $(V_{th}-V_{data}+V_{oled})-V_{oled}$, and K is a constant related to a production process and a driver design for the driving transistor DTFT.

As can be seen in the above equation, the operating current IOLED for the OLED is not affected by the threshold voltage $V_{th}$ of the driving transistor DTFT but merely related to the data signal $V_{data}$. As a result, it is able to thoroughly overcome the defects caused when the threshold voltage $V_{th}$ of the driving transistor DTFT is drifted due to the limitations of the manufacture process and a long-term operation, and eliminate the effect of the threshold voltage of the driving transistor DTFT on the operating current IOLED of the OLED, thereby to ensure a normal operation of the OLED in the pixel unit and improve the display evenness.

Figure 7:
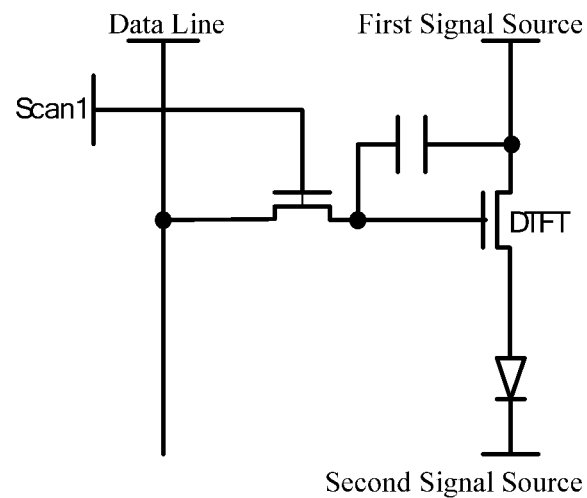
FIG. 7 is a schematic view showing an existing OLED driver circuit.

In addition, the advantageous effects of the pixel circuit and its driving method may be apparent by comparing, in a simulation test, the display driving module 1 in a 6T1C-based pixel circuit according to the embodiments of the present disclosure with an existing 2T1C-based AMOLED driver circuit in FIG. 7, through simulation software, e.g., P-Spice.

Figure 8:
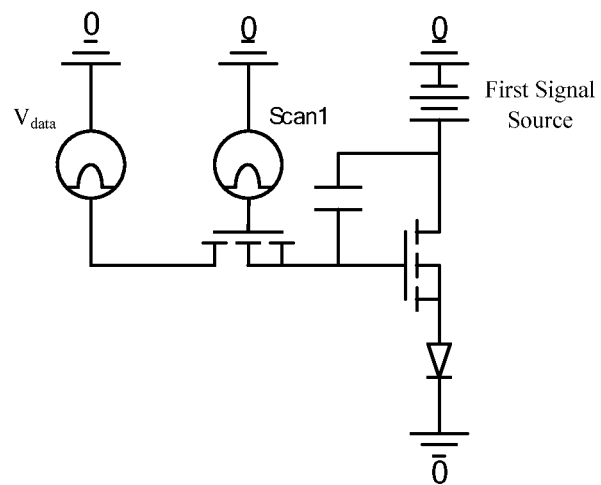
FIG. 8 is a schematic view showing a structure for a simulation test of a driving current for an existing OLED.
Figure 9:
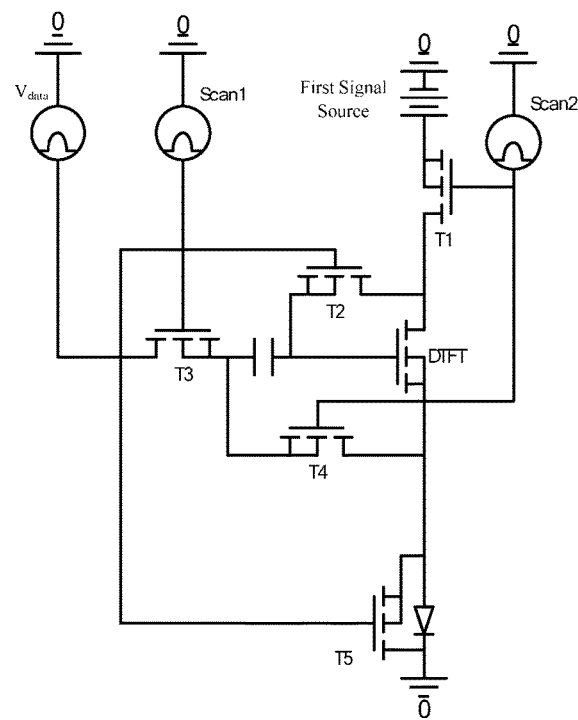
FIG. 9 is a schematic view showing a structure for a simulation test of the pixel circuit according to one embodiment of the present disclosure.
Figure 10:
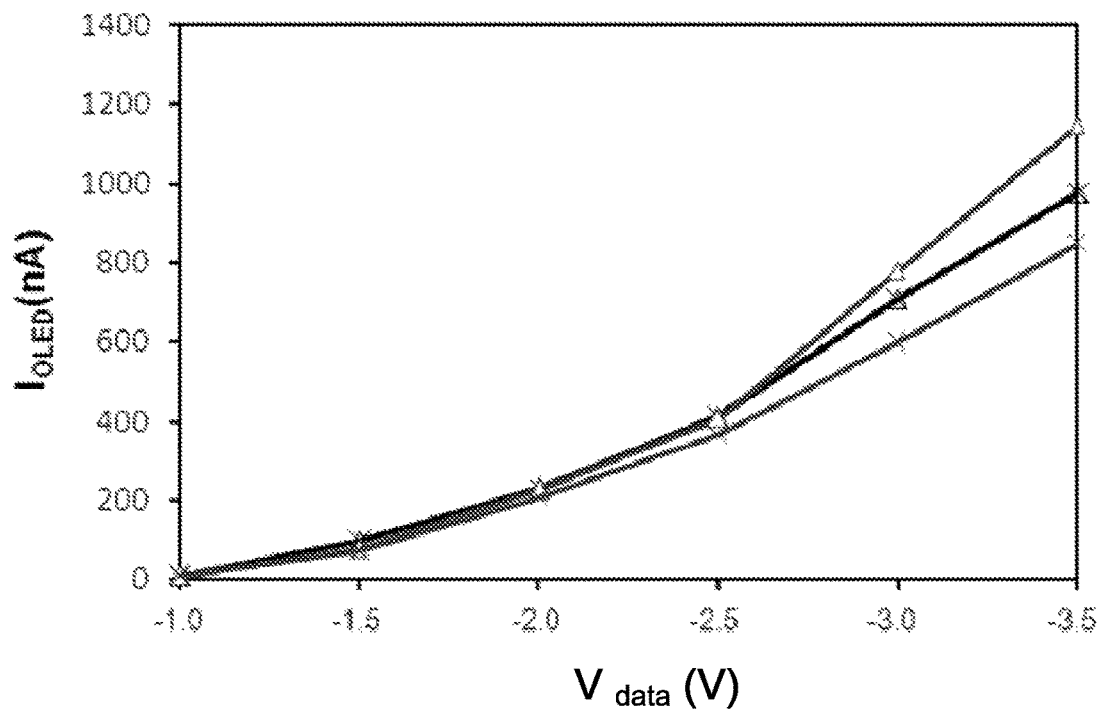
FIG. 10 is a view showing the driving currents IOLED for the OLED during the drifting of a threshold voltage $V_{th}$ of a driving transistor.

FIG. 8 shows a simulated circuit for an existing circuit structure in FIG. 7, FIG. 9 shows a simulated circuit for the display driving module 1 in the pixel circuit according to the embodiments of the present disclosure, and FIG. 10 shows the driving currents $I_{OLED}$ for the OLED during the drifting of the threshold voltage $V_{th}$ of the driving transistor.

As shown in FIG. 10, an upper line with triangles represents the driving currents for the existing driver circuit in FIG. 7 when $V_{th}=-0.33V$, a lower line with X-shaped patterns represents the driving currents for the existing driver circuit in FIG. 7 when $V_{th}=+0.33V$, and middle lines represent the driving currents for the pixel circuit according to the embodiments of the present disclosure when $V_{th}=-0.33V$ and $V_{th}=+0.33V$, respectively.

As can be seen from FIG. 10, when $V_{th}$ is drifted, the driving current for the pixel circuit according to the embodiments of the present disclosure is substantially not changed, so the middle lines representing the driving currents for the pixel circuit when $V_{th}=-0.33V$ and $V_{th}=+0.33V$ substantially overlap with each other. However, the lines representing the driving currents $I_{OLED}$ for the existing driver circuit in FIG. 7 are changed significantly.

Hence, as shown in FIG. 10, the pixel circuit according to the embodiments of the present disclosure is advantageous over the existing driver circuit.

Figure 11:
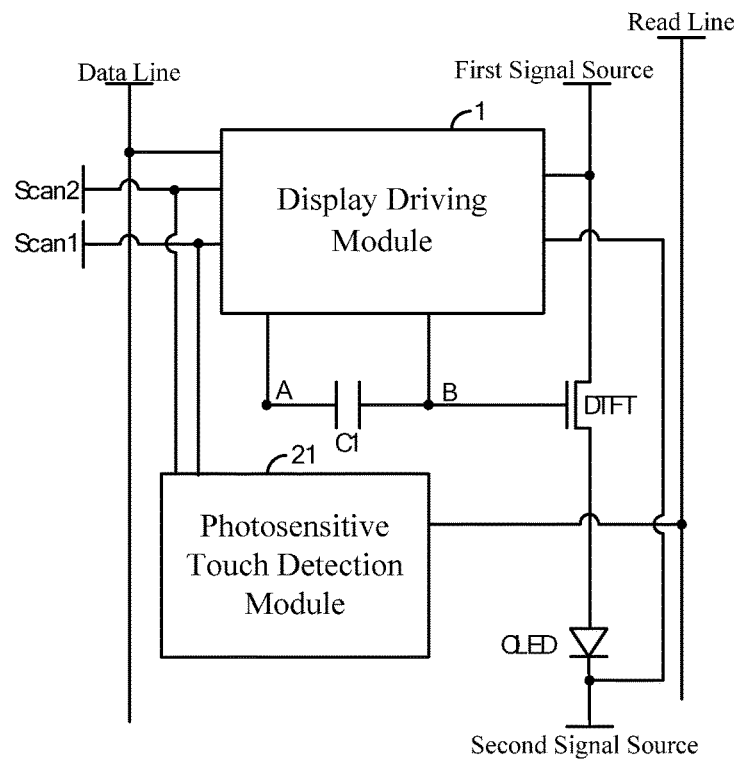
FIG. 11 is yet another schematic view showing the pixel circuit according to one embodiment of the present disclosure.

In one embodiment, as shown in FIG. 11, the touch detection module 2 may be a photosensitive touch detection module 21, which is configured to, based on an illumination change due to the touch operation, detect the touch signal for the touch panel under the control of the first scanning signal $V_{Scan1}$ from the first scanning line and the second scanning signal $V_{Scan2}$ from the second scanning line.

To be specific, the photosensitive touch detection module 21 detects a change in the illumination intensity through a photosensitive TFT arranged therein, compares a difference between the intensities of a photoelectric signal before and after the touch with a threshold so as to determine whether or not there is the touch operation, and then determine coordinates of the touch position according to the signal collected by the processor.

Through the photosensitive touch technique adopted in the embodiments of the present disclosure, it is able to improve the touch sensitivity and the touch function, and also to achieve the touch detection even when the pixel circuit is applied to a large-sized touch panel.

In addition, for the photosensitive touch technique, a touch object (e.g., a finger or stylus, which may shield the light and thus results in a decrease in the illumination intensity) may be directly adopted, or a laser pointer may be adopted so as to achieve remote touch (the illumination intensity may be increased when the touch point is irradiated by a laser beam).

In one embodiment, as shown in FIG. 11, the photosensitive touch detection module 21 is connected not only to the first scanning line Scan1, the second scanning line Scan2 and the signal read line, but also to the data line.

Figure 12:
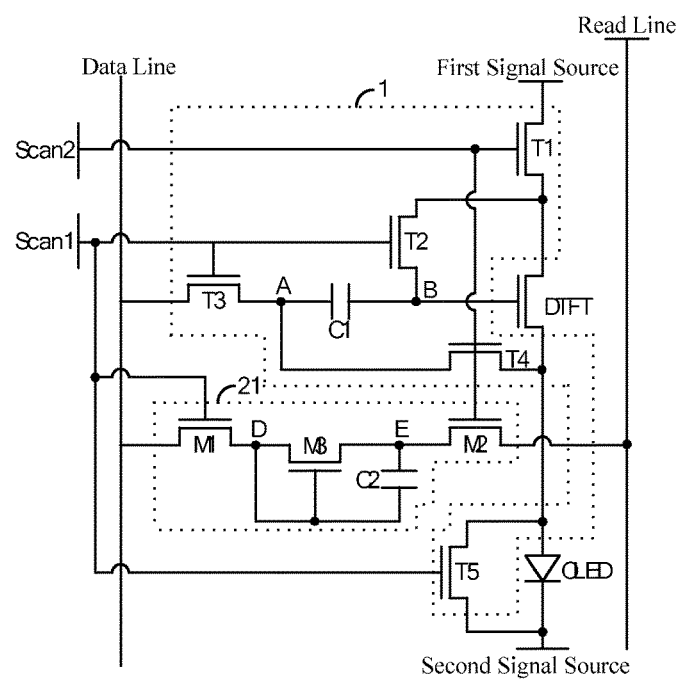
FIG. 12 is still yet another schematic view showing the pixel circuit according to one embodiment of the present disclosure.

As shown in FIG. 12, the photosensitive touch detection module 21 may include a second storage capacitor C2, a first switching transistor M1, a photosensitive transistor M3 and a second switching transistor M2. A first electrode of the first switching transistor M1 is connected to the data line, a gate electrode thereof is connected to the first scanning line, and a second electrode thereof is connected to a first electrode and a gate electrode of the photosensitive transistor M3 and a second end of the second storage capacitor. A second electrode of the photosensitive transistor M3 is connected to a first end of the second storage capacitor C2, and the photosensitive transistor M3 is configured to generate, based on the illumination intensity, a corresponding current signal for charging the second storage capacitor C2. A first electrode of the second switching transistor M2 is connected to the first end of the second storage capacitor, a gate electrode thereof is connected to the second scanning line, and a second electrode thereof is connected to the signal read line.

In order to achieve the photosensitive touch detection, the touch detection process involved in the method according to an embodiment of the present disclosure may further include: within the time period, detecting by the photosensitive touch detection module 21, based on the illumination change due to the touch operation, the touch signal for the touch panel under the control of the first scanning signal $V_{Scan1}$ from the first scanning line and the second scanning signal $V_{Scan2}$ from the second scanning line.

The photosensitive touch detection may be performed by the photosensitive touch detection module 21 synchronously with the display driving performed by the display driving module 1. The states of the photosensitive touch detection module 21 will be described hereinafter in conjunction with the sequence diagram in FIG. 3.

At a first stage, the photosensitive touch detection module 21 is at a resetting stage (where the display driving module 1 is at the charging stage). FIG. 3 shows at Stage 1 the signals. To be specific, the first scanning signal $V_{Scan1}$ may be a high level signal, the second scanning signal $V_{Scan2}$ may be a high level signal, and the data signal $V_{data}$ may be a low level signal, so as to enable the first switching transistor M1 and the second switching transistor M2 to be each in the ON state. As shown by a dotted arrow in FIG. 13, the data signal $V_{data}$ from the data line is transmitted through the first switching transistor M1, which is in the ON state, to a connection node of the first electrode and the gate electrode of the photosensitive transistor M3 and the second end of the storage capacitor C2, i.e., node D. The data signal $V_{data}$ is a low level signal at this stage, so it is able to reset the potentials of the photosensitive transistor M3 and the second storage capacitor C2. At the first stage, an initial signal is transmitted via the signal read line.

Figure 13:
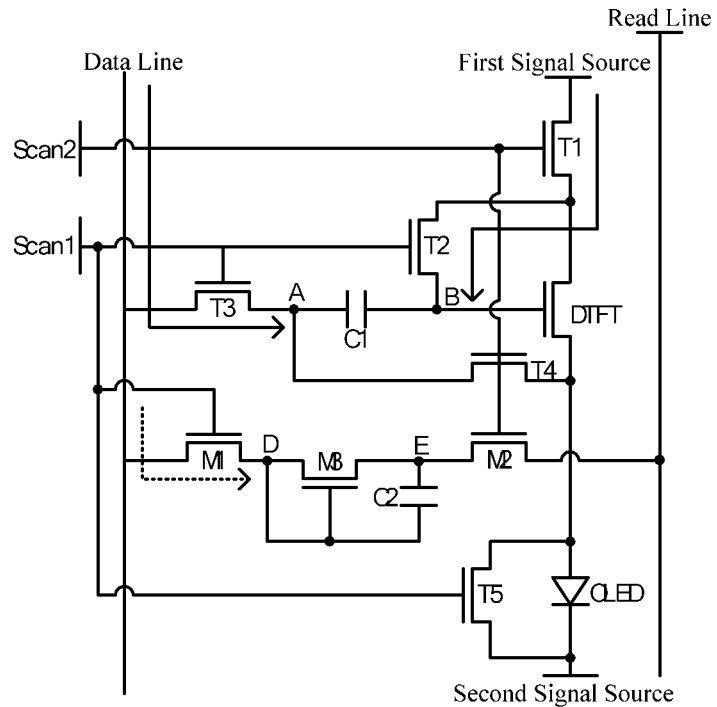
FIG. 13 is another schematic view showing the state of the pixel circuit at the first stage according to one embodiment of the present disclosure.

At a second stage, the photosensitive touch detection module 21 is still at the resetting stage (where the display driving module 1 is at the discharging and compensation stage). FIG. 3 shows at Stage 2 the signals. To be specific, the first scanning signal $V_{Scan1}$ may be a high level signal, the second scanning signal $V_{Scan2}$ may be a low level signal, and the data signal $V_{data}$ may be a low level signal, so as to enable the first switching transistor M1 to be in the ON state and enable the second switching transistor M2 to be in the OFF state. At this stage, the state of the photosensitive touch detection module 21 remains unchanged, i.e., the photosensitive touch detection module 21 is still in the potential resetting state. FIG. 13 shows the state of the photosensitive touch detection module 21.

Figure 14:
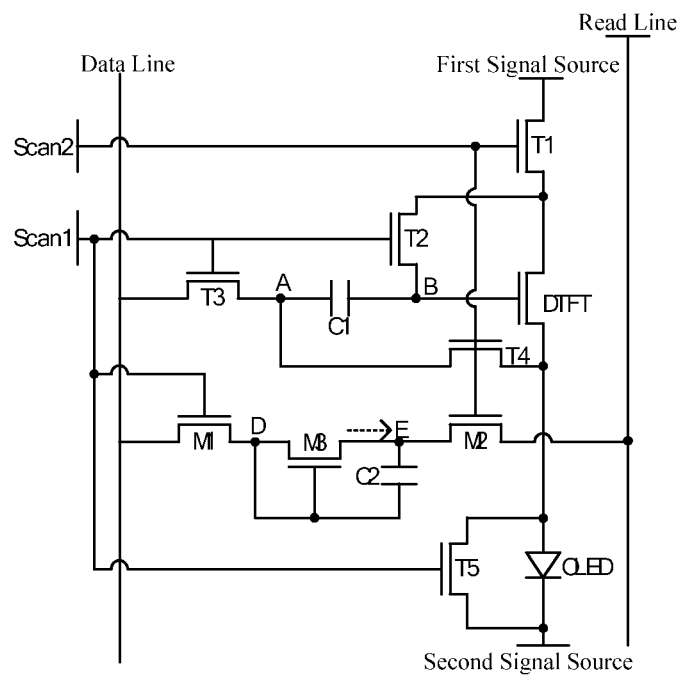
FIG. 14 is a schematic view showing a state of the pixel circuit at a third stage according to one embodiment of the present disclosure.

At a third stage, the photosensitive touch detection module 21 is at a touch signal storing stage (where the display driving module is at the stagnation stage). FIG. 3 shows at Stage 3 the signals. To be specific, the first scanning signal $V_{Scan1}$ may be a low level signal, the second scanning signal $V_{Scan2}$ may be a low level signal, and the data signal $V_{data}$ may be a high level signal, so as to enable the first switching transistor M1 and the second switching transistor M2 to be each in the OFF state. As shown by a dotted arrow in FIG. 14, when irradiated by the light, the photosensitive transistor M3 generates a corresponding current signal through its own potential conversion function based on the illumination intensity (i.e., whether or not there is the touch operation). This current signal may be used to charge the first end of the second storage capacitor C2, i.e., node E, so as to be ready for a subsequent current signal reading stage. At this time, a potential difference of the two ends of the second storage capacitor C2 is a constant.

Figure 15:
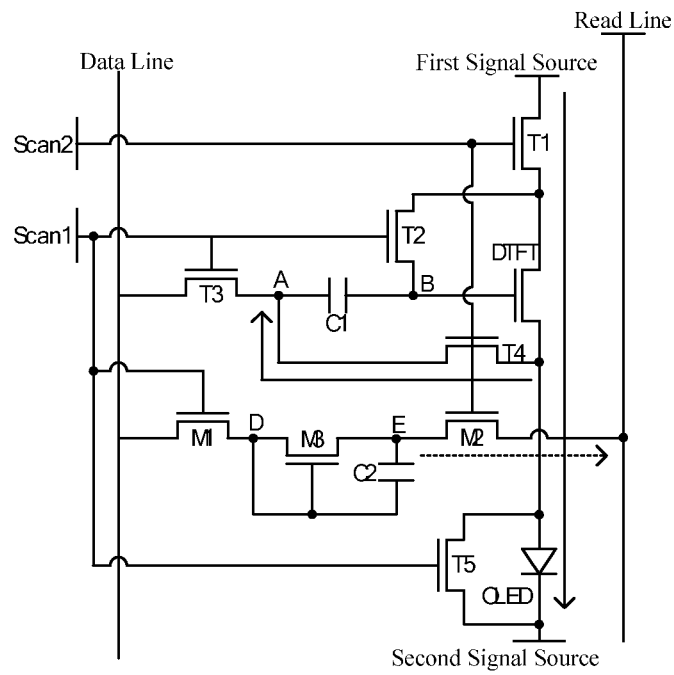
FIG. 15 is another schematic view showing the state of the pixel circuit at the fourth stage according to one embodiment of the present disclosure.

At a fourth stage, the photosensitive touch detection module 21 is at a touch signal reading stage (where the display driving module 1 is at the jumping and light-emitting stage). FIG. 3 shows at Stage 4 the signals. To be specific, the first scanning signal $V_{Scan1}$ may be a low level signal, the second scanning signal $V_{Scan2}$ may be a high level signal, and the data signal $V_{data}$ may be a high level signal, so as to enable the first switching transistor M1 to be in the OFF state and enable the second switching transistor M2 to be in the ON state. As shown by a dotted arrow in FIG. 15, the corresponding current signal has been stored in the second storage capacitor C2 at the previous stage, i.e., the third stage, so when the second switching transistor M2 is in the ON state, the current signal stored in the second storage capacitor C2 is transmitted through the second switching transistor M2 to the signal read line, and then to the processor connected to the signal read line. After analysis, the processor determines whether or not the photosensitive touch operation has been made, and if yes, determines the coordinates of the touch point.

When the photosensitive touch operation has been made, the intensity of the current signal stored in the storage capacitor C2 may be decreased (i.e., the illumination intensity may be decreased because the photosensitive transistor is shielded by the touch object when the touch object touches the touch panel) or increased (i.e., the illumination intensity may be increased when the remote touch operation is made by the laser pointer) as compared with the intensity of the current signal stored in the storage capacitor C2 when no photosensitive touch operation is made. Hence, the processor may compare the difference between the intensities of the photoelectric signal before and after the photosensitive touch operation with the predetermined threshold obtained when no photosensitive touch operation is made, so as to determine whether or not the photosensitive touch operation has been made (i.e., whether or not there is a change in the illumination intensity). In addition, the processor may determine an X-axis coordinate of the touch point according to a position where the signal is outputted from the second scanning line, and determine a Y-axis coordinate of the touch point according to a position of the signal read line that transmits the current signal, so as to determine the coordinates of the touch point.

Figure 16:
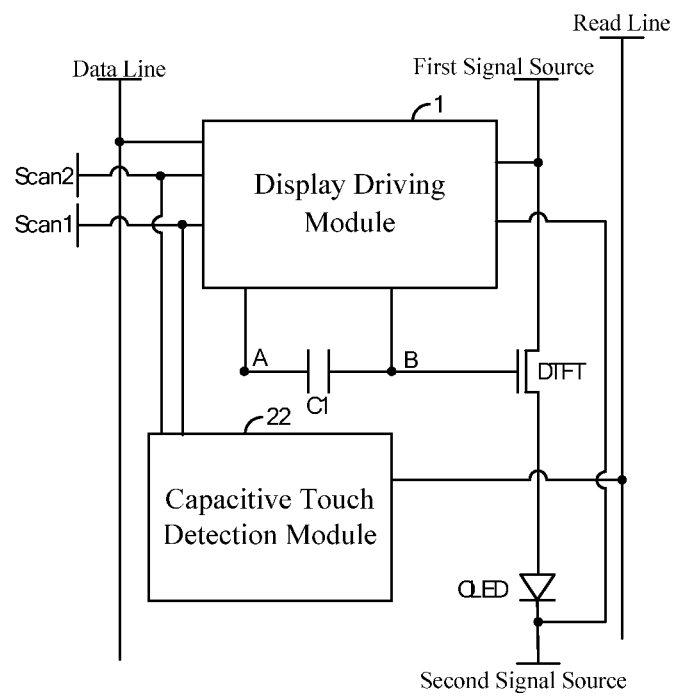
FIG. 16 is still yet another schematic view showing the pixel circuit according to one embodiment of the present disclosure.

In another embodiment, as shown in FIG. 16, the touch detection module 2 may also be a capacitive touch detection module 22, which is configured to, based on a capacitance change due to a touch operation, detect the touch signal for the touch panel under the control of the first scanning signal $V_{Scan1}$ from the first scanning line and the second scanning signal $V_{Scan2}$ from the second scanning line.

For the capacitive touch technique involved in the embodiments of the present disclosure, a change in the intensity of the current signal received by the processor may be determined in accordance with a change in a coupling capacitance generated between the touch object (e.g., a finger or stylus) and a detection electrode when the touch object touches the touch panel, so as to determine whether or not the capacitive touch operation has been made, and if yes, determine position information about the touch point.

In one embodiment, as shown in FIG. 16, the capacitive touch detection module 22 may be connected not only to the first scanning line, the second scanning line and the signal read line, but also to the third signal source. In the embodiments of the present disclosure, the third signal source is configured to input a signal with a fixed potential, e.g., a common electrode signal Vcom, into the capacitive touch detection module 22.

Figure 17:
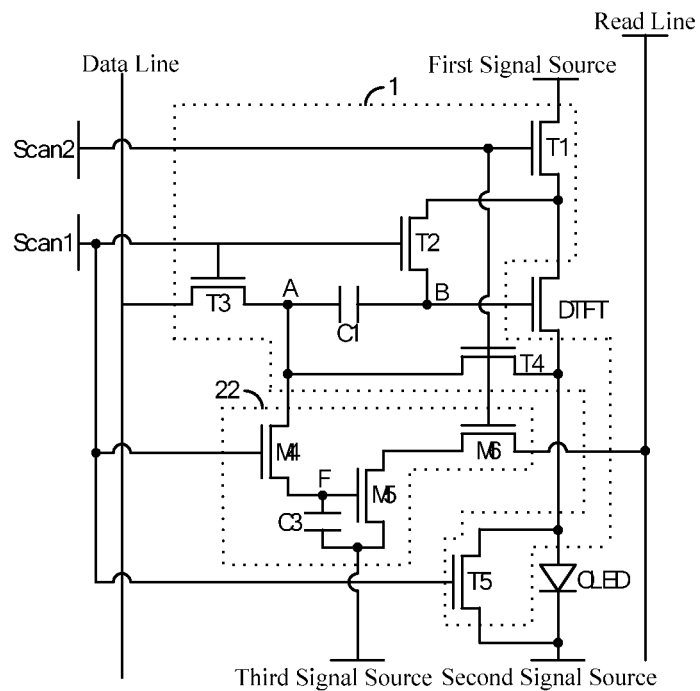
FIG. 17 is still yet another schematic view showing the pixel circuit according to one embodiment of the present disclosure.

As shown in FIG. 17, the capacitive touch detection module 22 may include a third storage capacitor C3, a resetting transistor M4, an amplifying transistor M5 and a third switching transistor M6. A first electrode of the resetting transistor M4 is connected to the first end of the first storage capacitor C1, a gate electrode thereof is connected to the first scanning line, and a second electrode thereof is connected to a first end of the third storage capacitor C3 and a gate electrode of the amplifying transistor M5. A first electrode of the amplifying transistor M5 is connected to a second end of the third storage capacitor C3 and the third signal source, and a second electrode thereof is connected to a first electrode of the third switching transistor M6. A gate electrode of the third switching transistor M6 is connected to the second scanning line, and a second electrode thereof is connected to the signal read line.

In order to achieve the capacitive touch detection, the touch detection process involved in the method according to an embodiment of the present disclosure may further include: within the time period, detecting by the capacitive touch detection module 22, based on the capacitance change due to the touch operation, the touch signal for the touch panel under the control of the first scanning signal $V_{Scan1}$ from the first scanning line and the second scanning signal $V_{Scan2}$ from the second scanning line.

The capacitive touch detection may be performed by the capacitive touch detection module 22 synchronously with the display driving performed by the display driving module 1. The states of the capacitive touch detection module 22 will be described hereinafter in conjunction with the sequence diagram in FIG. 3.

At a first stage, the capacitive touch detection module 22 is at a resetting stage (where the display driving module 1 is at the charging stage). FIG. 3 shows at Stage 1 the signals. To be specific, the first scanning signal $V_{Scan1}$ may be a high level signal, the second scanning signal $V_{Scan2}$ may be a high level signal, and the data signal $V_{data}$ may be a low level signal, so as to enable the resetting transistor M4 and the third switching transistor M6 to be each in the ON state. As shown by a dotted arrow in FIG. 18, the resetting transistor M4 is in the ON state, so the data signal $V_{data}$ from the data line is transmitted through the resetting transistor M4 to a connection node of the first electrode of the third storage capacitor C3 and the gate electrode of the amplifying transistor M5, i.e., node F, so as to charge the third storage capacitor C3 and enable the amplifying transistor M5 to be in an amplification state. After being amplified by the amplifying transistor M5, a third signal from the third signal source is transmitted through the third switching transistor M6 to the signal read line, and then transmitted to the processor connected to the signal read line. The third signal received by the processor at this stage may be used as a reference amplification signal, so that the processor may determine whether or not the capacitive touch operation has been made based on this reference amplification signal when a signal is received again.

Figure 18:
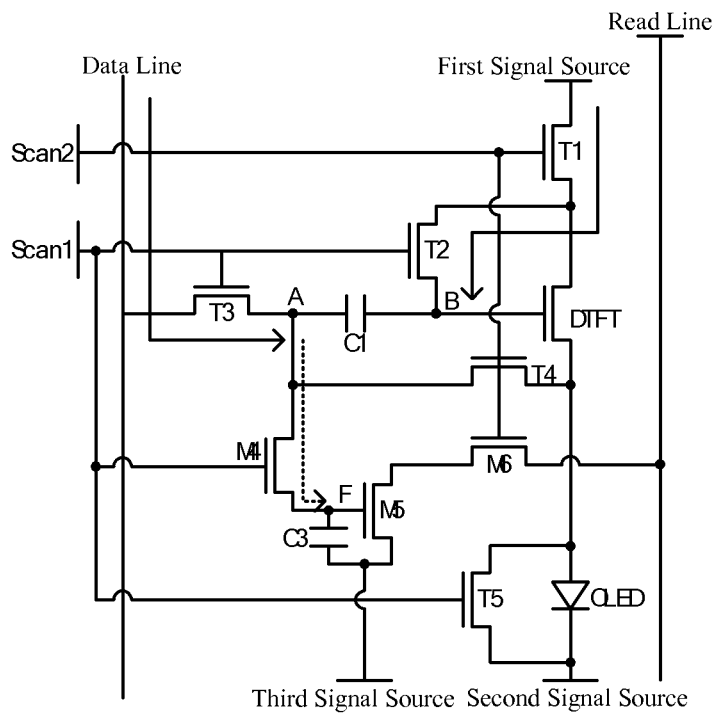
FIG. 18 is yet another schematic view showing the state of the pixel circuit at the first stage according to one embodiment of the present disclosure.

At a second stage, the capacitive touch detection module 22 is still at the resetting stage (where the display driving module 1 is at the discharging and compensation stage). FIG. 3 shows at Stage 2 the signals. To be specific, the first scanning signal $V_{Scan1}$ may be a high level signal, the second scanning signal $V_{Scan2}$ may be a low level signal, and the data signal $V_{data}$ may be a low level signal, so as to enable the resetting transistor M4 and the amplifying transistor M5 to be in the ON state and enable the third switching transistor M6 to be in the OFF state. At this stage, the state of the capacitive touch detection module 22 remains unchanged, i.e., the capacitive touch detection module 22 is still in the potential resetting state. FIG. 18 shows the state of the capacitive touch detection module 22.

At a third stage, the capacitive touch detection module 22 is at a stagnation stage (where the display driving module is also at the stagnation stage). FIG. 3 shows at Stage 3 the signals. To be specific, the first scanning signal $V_{Scan1}$ may be a low level signal, the second scanning signal $V_{Scan2}$ may be a low level signal, and the data signal $V_{data}$ may be a high level signal, so as to enable the resetting transistor M4 and the third switching transistor M6 to be in the OFF state, thereby to be ready for a next signal reading stage.

At a fourth stage, the capacitive touch detection module 22 is at a touch signal reading stage (where the display driving module 1 is at the jumping and light-emitting stage). FIG. 3 shows at Stage 4 the signals. To be specific, the first scanning signal $V_{Scan1}$ may be a low level signal, the second scanning signal $V_{Scan2}$ may be a high level signal, and the data signal $V_{data}$ may be a high level signal, so as to enable the resetting transistor M4 to be in the OFF state and enable the third switching transistor M6 to be in the ON state.

Figure 19:
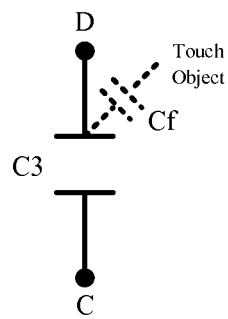
FIG. 19 is a view showing the principle of a capacitive touch technique involved in the pixel circuit according to one embodiment of the present disclosure.
Figure 20:
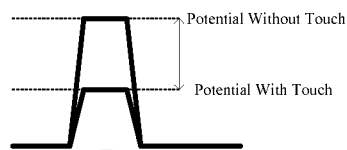
FIG. 20 is another view showing the principle of the capacitive touch technique involved in the pixel circuit according to one embodiment of the present disclosure.
Figure 21:
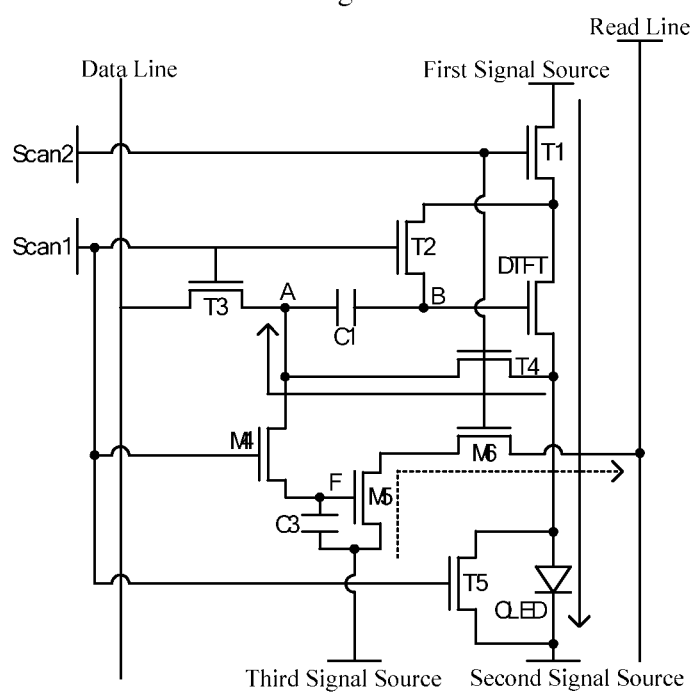
FIG. 21 is yet another schematic view showing the state of the pixel circuit at the fourth stage according to one embodiment of the present disclosure.

When the touch object touches the touch panel at the fourth stage, a potential at node F connected to the detection electrode may be decreased (FIGS. 19 and 20 show the principle for the decrease in the potential, i.e., the potential at node F may be decreased due to a coupling capacitance Cf generated between the touch object and the detection electrode). At this time, the amplifying transistor may be in a half cut-off state (where the amplifying transistor M5 loses its ability to amplify the signal from the third signal source) or a cut-off state, so the intensity of the signal transmitted through the third switching transistor M6 to the signal read line (as shown by a dotted arrow in FIG. 21) may be decreased, or no signal is transmitted to the signal read line, thereby the intensity of the signal received by the processor connected to the signal read line may be reduced, or even no signal is received by the processor. The processor may determine, based on this change, whether or not the capacitive touch operation has been made, and then determine an X-axis coordinate of the touch point according to a position where the signal is outputted from the second scanning line, and determine a Y-axis coordinate of the touch point according to a position of the signal read line that transmits the current signal, so as to determine the coordinates of the touch point.

The touch modes adopted by the touch detection module 2 are described hereinabove. Of course, any other touch modes may also be used to achieve the touch detection.

Figure 22:
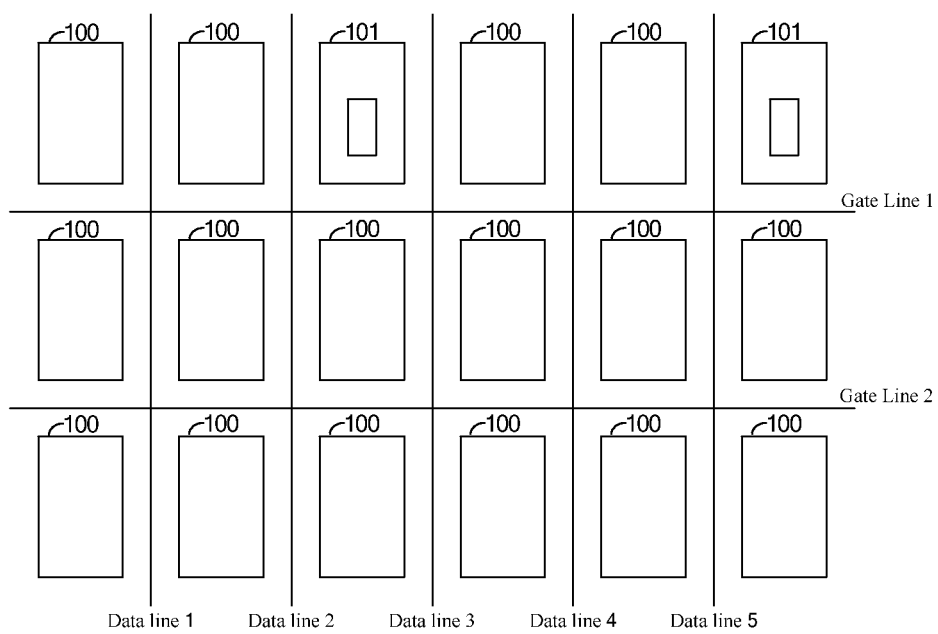
FIG. 22 is a schematic view showing the arrangement of the pixel circuits according to one embodiment of the present disclosure.

In the embodiments of the present disclosure, when designing the pixels, the touch detection modules 2 may, based on the requirements on the resolution for touch, be arranged within a specified pixel unit in a predetermined manner. For example, the touch detection modules 2 may be arranged in a 3*3 mode as shown in FIG. 22, i.e., in 3*3 pixel units, the display driving module 1 and the touch detection module 2 are merely arranged in one pixel unit 101, and merely the display driving module 1 is arranged in the other pixel units, so as to simplify the structure of the pixel units, thereby to reduce the production cost of the display panel.

The transistor included in the display driving module 1 and the touch detection module 2 may be N-type transistors, so as to manufacture the transistors by an identical process, thereby to improve the yield of the display device.

The present disclosure further provides in one embodiment an OLED display panel including the above-mentioned pixel circuit.

The present disclosure further provides in one embodiment a display device including the above-mentioned OLED display panel. The display device may be a liquid crystal panel, a liquid crystal TV, a liquid crystal display, an OLED panel, an OLED display, a plasma display or an electronic paper.

The pixel circuit, the OLED display panel and the display panel in the embodiments of the present disclosure is particularly suitable for a gate-on-array (GOA) circuit manufactured by a low temperature poly-silicon (LTPS) process or an a-Si process.

According to the embodiments of the present disclosure, the pixel circuit may include: the display driving module, which is connected to the first scanning line, the second scanning line, the data line, the first signal source and the second signal source, and configured to, within the time period, compensate for the threshold voltage of the driving transistor using the data signal from the data line and the first signal from the first signal source under the control of the first scanning signal from the first scanning line and the second scanning signal from the second scanning line, so that the light-emitting driving signal for the OLED is irrelevant to the threshold voltage of the driving transistor within the fourth stage of the time period; and the touch detection module, which is connected to the first scanning line, the second scanning line and the signal read line, and configured to, within the time period, detect the touch signal for the touch panel under the control of the first scanning signal from the first scanning line and the second scanning signal from the second scanning line.

According to the embodiments of the present disclosure, the driving signal for the OLED is relevant to the threshold voltage $V_{th}$ of the driving transistor DTFT, so it is able to eliminate an effect of the threshold voltage $V_{th}$ of the driving transistor DTFT on the light-emitting driving signal, thereby to improve the brightness evenness of the OLED display panel and improve the display effect of the display device.

In addition, a touch signal detection signal for an in-cell touch panel may be integrated into the pixel unit, so it is able to perform the display driving and the touch detection simultaneously, thereby to achieve the integration of the pixel circuit and the touch signal detection circuit. In this way, it is able to reduce a thickness and a weight of the display panel, thereby to reduce the production cost thereof.

Moreover, according to the embodiments of the present disclosure, it is able to prevent the current from flowing through the OLED for a long period of time, thereby to prolong a service life of the OLED.

It should be appreciated that, the pixel circuit in the embodiments of the present disclosure may include a-Si, poly-Si or oxide TFTs, and these TFTs may be replaced with P-type TFTs or complementary metal oxide semiconductor (CMOS) transistors. In addition, although the description is given hereinbefore by taking the display device including the AMOLED as an example, the display device may also include the other LEDs.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A pixel circuit, comprising a first storage capacitor, a driving transistor, and an organic light-emitting diode (OLED), wherein
   a first electrode of the driving transistor is connected to a first signal source, a gate electrode of the driving transistor is connected to a second end of the first storage capacitor, and a second electrode of the driving transistor is connected to an anode of the OLED,
   the pixel circuit further comprises:
   a display driving module, connected to a first scanning line, a second scanning line, a data line, the first signal source, a second signal source, a first end and the second end of the first storage capacitor, and configured to, within a time period, compensate for a threshold voltage of the driving transistor using a data signal from the data line and a first signal from the first signal source under the control of a first scanning signal from the first scanning line and the second scanning signal from the second scanning line, to make a light-emitting driving signal for the OLED be irrelevant to the threshold voltage of the driving transistor within a fourth stage of the time period; and a touch detection module, connected to the first scanning line, the second scanning line and a signal read line, and configured to, within the time period, detect a touch signal for a touch panel under the control of the first scanning signal from the first scanning line and the second scanning signal from the second scanning line;

wherein the display driving module comprises a first thin film transistor (TFT), a second TFT, a third TFT, a fourth TFT and a fifth TFT; a first electrode of the first TFT is connected to the first signal source, a gate electrode of the first TFT is connected to the second scanning line, and a second electrode of the first TFT is connected to the first electrode of the driving transistor; a first electrode of the second TFT is connected to the first electrode of the driving transistor, a gate electrode of the second TFT is connected to the first scanning line, and a second electrode of the second TFT is connected to the second end of the first storage capacitor; a first electrode of the third TFT is connected to the data line, a gate electrode of the third TFT is connected to the first scanning line, and a second electrode of the third TFT is connected to the first end of the first storage capacitor; a first electrode of the fourth TFT is connected to the first end of the first storage capacitor, a gate electrode of the fourth TFT is connected to the second scanning line, and a second electrode of the fourth TFT is connected to the second electrode of the driving transistor; and a first electrode of the fifth TFT is connected to the second electrode of the driving transistor, a gate electrode of the fifth TFT is connected to the first scanning line, and a second electrode of the fifth TFT is connected to the second signal source.

2. The pixel circuit according to claim 1, wherein the first signal is a high level signal, and a second signal from the second signal source is a low level signal or the ground serves as the second signal source.

3. The pixel circuit according to claim 1, wherein the touch detection module is a photosensitive touch detection module, which is configured to, based on an illumination change due to a touch operation, detect the touch signal for the touch panel under the control of the first scanning signal from the first scanning line and the second scanning signal from the second scanning line; and the photosensitive touch detection module is further connected to the data line.

4. The pixel circuit according to claim 3, wherein the photosensitive touch detection module comprises a second storage capacitor, a first switching transistor, a photosensitive transistor and a second switching transistor;

a first electrode of the first switching transistor is connected to the data line, a gate electrode of the first switching transistor is connected to the first scanning line, and a second electrode of the first switching transistor is connected to a first electrode and a gate electrode of the photosensitive transistor and a second end of the second storage capacitor;

a second electrode of the photosensitive transistor is connected to a first end of the second storage capacitor, and the photosensitive transistor is configured to generate, based on illumination intensity, a corresponding current signal for charging the second storage capacitor; and a first electrode of the second switching transistor is connected to the first end of the second storage capacitor, a gate electrode of the second switching transistor is connected to the second scanning line, and a second electrode of the second switching transistor is connected to the signal read line.

5. The pixel circuit according to claim 1, wherein the touch detection module is a capacitive touch detection module, which is configured to, based on a capacitance change due to a touch operation, detect the touch signal for the touch panel under the control of the first scanning signal from the first scanning line and the second scanning signal from the second scanning line, and the capacitive touch detection module is further connected to a third signal source.

6. The pixel circuit according to claim 5, wherein the third signal source is configured to input a signal with a fixed potential to the capacitive touch detection module.

7. The pixel circuit according to claim 6, wherein the third signal source is a common electrode signal.

8. The pixel circuit according to claim 5, wherein the capacitive touch detection module comprises a third storage capacitor, a resetting transistor, an amplifying transistor and a third switching transistor;

a first electrode of the resetting transistor is connected to the first end of the first storage capacitor, a gate electrode of the resetting transistor is connected to the first scanning line, and a second electrode of the resetting transistor is connected to a first end of the third storage capacitor and a gate electrode of the amplifying transistor;

a first electrode of the amplifying transistor is connected to a second end of the third storage capacitor and the third signal source, and a second electrode of the amplifying transistor is connected to a first electrode of the third switching transistor; and a gate electrode of the third switching transistor is connected to the second scanning line, and a second electrode of the third switching transistor is connected to the signal read line.

9. A method for driving the pixel circuit according to claim 1, comprising steps of:

within a time period, compensating for a threshold voltage of a driving transistor using a data signal from a data line and a first signal from a first signal source under the control of a first scanning signal from a first scanning line and a second scanning signal from a second scanning line, to make a light-emitting driving signal for an organic light-emitting diode (OLED) be irrelevant to the threshold voltage of the driving transistor at a fourth stage within the time period; and within the time period, detecting a touch signal for a touch panel under the control of the first scanning signal from the first scanning line and the second scanning signal from the second scanning line.

10. The method according to claim 9, wherein the step of, within the time period, compensating for the threshold voltage of the driving transistor using the data signal from the data line and the first signal from the first signal source under the control of the first scanning signal from the first scanning line and the second scanning signal from the second scanning line, to make the light-emitting driving signal for the OLED be irrelevant to the threshold voltage of the driving transistor at the fourth stage within the time period comprises:

at a first stage of the time period, enabling a first thin film transistor (TFT), a second TFT, a third TFT, a fourth TFT and a fifth TFT to be each in an ON state so as to enable a first end of a first storage capacitor to be at a potential of the data signal and enable a second end of the first storage capacitor to be at a potential of the first signal;

at a second stage of the time period, enabling the second TFT, the third TFT and the fifth TFT to be each in the ON state and enabling the first TFT and the fourth TFT to be each in an OFF state so as to enable the first end of the first storage capacitor to be at the potential of the data signal, and discharging the first storage capacitor so as to change a potential at the second end of the first storage capacitor from the potential of the first signal to a potential equal to the threshold voltage of the driving transistor, thereby to enable a voltage difference between the two ends of the first storage capacitor to be a difference between the threshold voltage of the driving transistor and the potential of the data signal;

at a third stage of the time period, enabling the first TFT, the second TFT, the third TFT, the fourth TFT and the fifth TFT to be each in the OFF state so as to maintain the voltage difference between the two ends of the first storage capacitor to be the difference between the threshold voltage of the driving TFT and the potential of the data signal; and at the fourth stage of the time period, enabling the first TFT and the fourth TFT to be each in the ON state, and enabling the second TFT, the third TFT and the fifth TFT to be each in the OFF state, so as to enable the potential at the first end of the first storage capacitor to be jumped from the potential of the data signal to a potential at a second electrode of the driving transistor, thereby to enable the potential at the second end of the first storage capacitor to be a sum of the difference between the threshold voltage of the driving transistor and the potential of the data signal, and the potential at the second electrode of the driving transistor.

11. The method according to claim 9, wherein the step of, within the time period, detecting the touch signal for the touch panel under the control of the first scanning signal from the first scanning line and the second scanning signal from the second scanning line comprises:

within the time period, detecting, by a photosensitive touch detection module, the touch signal for the touch panel based on an illumination change due to a touch operation under the control of the first scanning signal from the first scanning line and the second scanning signal from the second scanning line.

12. The method according to claim 11, wherein the step of, within the time period, detecting, by the photosensitive touch detection module, the touch signal for the touch panel based on the illumination change due to the touch operation under the control of the first scanning signal from the first scanning line and the second scanning signal from the second scanning line comprises:

at a first stage of the time period, enabling a first switching transistor and a second switching transistor to be each in an ON state, so as to enable a first end of a second storage capacitor, and a first electrode and a gate electrode of a photosensitive transistor to be at a potential of the data signal;

at a second stage of the time period, enabling the first switching transistor to be in the ON state and enabling the second switching transistor to be in an OFF state, so as to maintain the first end of the second storage capacitor, and the first electrode and the gate electrode of the photosensitive transistor to be at the potential of the data signal;

at a third stage of the time period, enabling the first switching transistor and the second switching transistor to be each in the OFF state, and generating by the photosensitive transistor, based on an illumination intensity, a corresponding current signal for charging the second storage capacitor; and at the fourth stage of the time period, enabling the first switching transistor to be in the OFF state and enabling the second switching transistor to be in the ON state, so as to transmit the current signal stored in the second storage capacitor to a signal read line, thereby to enable a processor connected to the signal read line to determine whether or not the touch operation has been made according to the current signal, and if yes, determine position information about a touch point.

13. The method according to claim 9, wherein the step of, within the time period, detecting the touch signal for the touch screen under the control of the first scanning signal from the first scanning line and the second scanning signal from the second scanning line comprises:

within the time period, detecting by a capacitive touch detection module, based on a capacitance change due to the touch operation, the touch signal for the touch panel under the control of the first scanning signal from the first scanning line and the second scanning signal from the second scanning line.

14. The method according to claim 13, wherein the step of, within the time period, detecting by the capacitive touch detection module, based on the capacitance change due to the touch operation, the touch signal for the touch panel under the control of the first scanning signal from the first scanning line and the second scanning signal from the second scanning line comprises:

at a first stage of the time period, enabling a resetting transistor and a third switching transistor to be each in the ON state, so as to enable a first end of a third storage capacitor and a gate electrode of an amplifying transistor to be at the potential of the data signal;

at a second stage of the time period, enabling the resetting transistor to be in the ON state and enabling the third switching transistor to be in the OFF state, so as to maintain the first end of the third storage capacitor and the gate electrode of the amplifying transistor to be at the potential of the data signal;

at a third stage of the time period, enabling the resetting transistor and the third switching transistor to be each in the OFF state; and at the fourth stage of the time period, enabling the resetting transistor to be in the OFF state, enabling the third switching transistor to be in the ON state, enabling the amplifying transistor to be in a corresponding state based on whether or not the touch operation for the touch panel has been made, so as to transmit by the signal read line a current signal corresponding to the state of the amplifying transistor, thereby to enable a processor connected to the signal read line to determine whether or not the touch operation has been made according to the current signal, and if yes, determine position information about a touch point.

15. The method according to claim 10, wherein at the first stage of the time period, the first scanning signal is a high level signal, the second scanning signal is a high level signal, and the data signal is a low level signal;

at the second stage of the time period, the first scanning signal is a high level signal, the second scanning signal is a low level signal, and the data signal is a low level signal;

at the third stage of the time period, the first scanning signal is a low level signal, the second scanning signal is a low level signal, and the data signal is a high level signal; and at the fourth stage of the time period, the first scanning signal is a low level signal, the second scanning signal is a high level signal and the data signal is a high level signal.

16. An organic light-emitting diode (OLED) display panel comprising the pixel circuit according to claim 1.

17. The OLED display panel according to claim 16, wherein based on the requirements on a resolution for touch, the pixel circuits each having a touch detection module are arranged within a specified pixel unit in a predetermined manner.

18. A display device comprising the organic light-emitting diode (OLED) display panel according to claim 16.

19. A method for driving a pixel circuit comprising a first storage capacitor, a driving transistor, an organic light-emitting diode (OLED), a display driving module and a photosensitive touch detection module, wherein a first electrode of the driving transistor is connected to a first signal source, a gate electrode of the driving transistor is connected to a second end of the first storage capacitor, and a second electrode of the driving transistor is connected to an anode of the OLED, the display driving module is connected to a first scanning line, a second scanning line, a data line, the first signal source, a second signal source, a first end and the second end of the first storage capacitor, and the photosensitive touch detection module comprises a second storage capacitor, a first switching transistor, a photosensitive transistor and a second switching transistor, and the method comprises steps of:

within a time period, compensating for a threshold voltage of the driving transistor by the display driving module using a data signal from a data line and a first signal from the first signal source under the control of a first scanning signal from a first scanning line and a second scanning signal from a second scanning line, to make a light-emitting driving signal for the organic light-emitting diode (OLED) be irrelevant to the threshold voltage of the driving transistor at a fourth stage within the time period; and within the time period, under the control of the first scanning signal from the first scanning line and the second scanning signal from the second scanning line, at a first stage of the time period, enabling the first switching transistor and the second switching transistor to be each in an ON state, so as to enable a first end of the second storage capacitor, and a first electrode and a gate electrode of the photosensitive transistor to be at a potential of the data signal;

at a second stage of the time period, enabling the first switching transistor to be in the ON state and enabling the second switching transistor to be in an OFF state, so as to maintain the first end of the second storage capacitor, and the first electrode and the gate electrode of the photosensitive transistor to be at the potential of the data signal;

at a third stage of the time period, enabling the first switching transistor and the second switching transistor to be each in the OFF state, and generating by the photosensitive transistor, based on an illumination intensity, a corresponding current signal for charging the second storage capacitor; and at the fourth stage of the time period, enabling the first switching transistor to be in the OFF state and enabling the second switching transistor to be in the ON state, so as to transmit the current signal stored in the second storage capacitor to a signal read line, thereby to enable a processor connected to the signal read line to determine whether or not the touch operation has been made according to the current signal, and if yes, determine position information about a touch point.

20. A method for driving a pixel circuit comprising a first storage capacitor, a driving transistor, an organic light-emitting diode (OLED), a display driving module and a photosensitive touch detection module, wherein a first electrode of the driving transistor is connected to a first signal source, a gate electrode of the driving transistor is connected to a second end of the first storage capacitor, and a second electrode of the driving transistor is connected to an anode of the OLED, the display driving module is connected to a first scanning line, a second scanning line, a data line, the first signal source, a second signal source, a first end and the second end of the first storage capacitor, and the capacitive touch detection module comprises a resetting transistor, a third switching transistor, a third storage capacitor and an amplifying transistor, and the method comprises steps of:

within a time period, compensating for a threshold voltage of the driving transistor by the display driving module using a data signal from a data line and a first signal from the first signal source under the control of a first scanning signal from a first scanning line and a second scanning signal from a second scanning line, to make a light-emitting driving signal for the organic light-emitting diode (OLED) be irrelevant to the threshold voltage of the driving transistor at a fourth stage within the time period; and within the time period, under the control of the first scanning signal from the first scanning line and the second scanning signal from the second scanning line, at a first stage of the time period, enabling the resetting transistor and the third switching transistor to be each in the ON state, so as to enable a first end of the third storage capacitor and a gate electrode of the amplifying transistor to be at the potential of the data signal;

at a second stage of the time period, enabling the resetting transistor to be in the ON state and enabling the third switching transistor to be in the OFF state, so as to maintain the first end of the third storage capacitor and the gate electrode of the amplifying transistor to be at the potential of the data signal;

at a third stage of the time period, enabling the resetting transistor and the third switching transistor to be each in the OFF state; and at the fourth stage of the time period, enabling the resetting transistor to be in the OFF state, enabling the third switching transistor to be in the ON state, enabling the amplifying transistor to be in a corresponding state based on whether or not the touch operation for the touch panel has been made, so as to transmit by the signal read line a current signal corresponding to the state of the amplifying transistor, thereby to enable a processor connected to the signal read line to determine whether or not the touch operation has been made according to the current signal, and if yes, determine position information about a touch point.

* * * * *